United States Patent [19]

Ogawa et al.

[11] 4,031,194

[45] June 21, 1977

[54] CONTINUOUS PROCESS FOR PREPARING BROMINE

[75] Inventors: Yoshihisa Ogawa; Tsunenori Inazaki; Michihiro Kouda, all of Onoda, Japan

[73] Assignee: Nissan Chemical Industries, Ltd., Yamaguchi, Japan

[22] Filed: Feb. 17, 1976

[21] Appl. No.: 658,767

Related U.S. Application Data

[63] Continuation of Ser. No. 497,628, Aug. 15, 1974, abandoned.

[52] U.S. Cl. ............................... 423/500; 423/504; 423/507
[51] Int. Cl.² ......................................... C01B 7/10
[58] Field of Search ........... 423/500, 504, 505, 507

[56] References Cited

UNITED STATES PATENTS

| | | | |
|---|---|---|---|
| 1,902,801 | 3/1933 | Harlow | 423/505 |
| 2,359,221 | 9/1944 | Kenaga | 423/500 |

*Primary Examiner*—Edward Stern
*Attorney, Agent, or Firm*—Oblon, Fisher, Spivak, McClelland & Maier

[57] ABSTRACT

Bromine is continuously produced by simultaneously feeding an aqueous solution of bromide or hydrobromic acid and chlorine gas into the top of a contact tower which is separated into an upper reaction section and a lower distillation section, having a gas outlet port therebetween; and feeding steam from the bottom of the tower whereby free bromine formed in the upper reaction port section and free bromine distilled from the lower distillation tower section are recovered through said bromine outlet port, wherein the aqueous solution containing bromide or hydrobromic acid is heated at lower than 80° C in the reaction section and the solution is heated to higher than 90° C in the distillation section.

2 Claims, 1 Drawing Figure

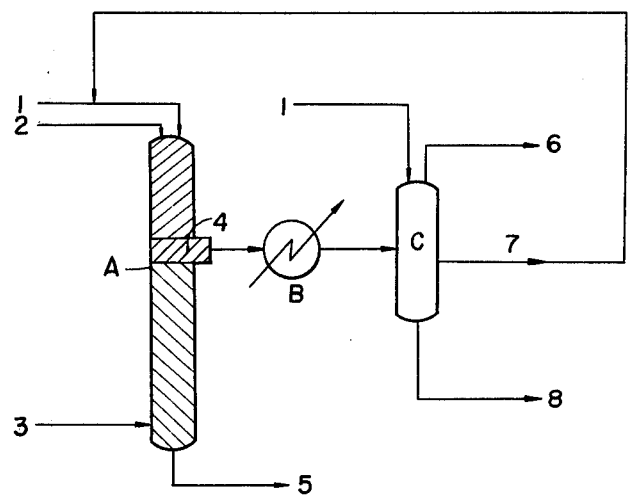

CONTINUOUS PROCESS FOR PREPARING BROMINE

This is a continuation of application Ser. No. 497,628 filed Aug. 15, 1976, now abandoned.

BACKGROUND OF THE INVENTION

1. Field of the Invention:

The present invention relates to a highly efficient continuous process for the preparation of bromine whereby chlorine is introduced into an aqueous solution which contains a bromide, so as to generate free bromine.

2. Description of Prior Art:

In the past, bromine has been produced from bromide containing solutions by the "Kubierscky's distillation method", or a modification thereof. In that method a bromide solution is fed counter-currently in a multiple plate contact tower, made of granite or similar effect material. Chlorine gas is fed into the bottom of the tower, and contacts the bromide solution which is fed from the top of the column. Bromine, which is produced by the reaction, is distilled from the top of the tower by the introduction of steam from the bottom of the tower, and is recovered.

One difficulty with the prior art procedures, however, is that both chlorine and steam must be simultaneously introduced into the column. This in turn requires that the temperature of the entire tower be kept high, which is quite disadvantageous for the exothermic vapor-liquid reaction of the chlorine with the bromide containing solution. Moreover, bromine vapor has a significantly higher specific gravity (about 10 times) compared to that of steam, so that bromine gas will not rise readily in the tower, but will tend to accumulate in a lower layer. Invariably, some of bromine is discharged from the bottom of the tower. In order to distill all of bromine from the top of the tower and to overcome the high resistance of the tower, the steam consumption must be further increased.

SUMMARY OF THE INVENTION

Accordingly, it is one object of the present invention to provide a continuous process for the preparation of bromine in high efficiency without loss of bromine from the bottom of the tower.

This object and other objects of this invention as will hereinafter become more readily understood by the following description, have been attained by modifying the contact tower so that the reaction, forming bromine, is carried out in an upper portion of the tower, and distillation is carried out in the bottom section of the column, whereby the bromine is removed from the middle of the column. An aqueous solution containing bromide and chlorine is fed cocurrently into the top of the contact tower.

The chlorinating reaction is permitted to occur in the top of the column. A portion of the free bromine generated by the reaction is heated by the exotherm from the reaction and rises and is discharged from the middle of the contact tower. Steam distillation is used to recover the remaining bromine also from the middle section.

BRIEF DESCRIPTION OF THE DRAWING

The FIGURE is a schematic view of the system for continuous preparation of bromine according to the invention.

DETAILED DESCRIPTION OF THE PREFERRED EMBODIMENTS

In the present invention, the bromine forming portion of the reaction is separated from the lower, or steam distillation portion, by a bromine outlet which is situated at the middle plate of a multiplate contact tower. The chlorinating reaction is effected at a relatively lower temperature.

Since bromine has a relatively high specific gravity, it rises only to the extent of the middle section of the tower. This process thus enables the use of a smaller contact tower since the distillation section of the tower is separated from the reaction section of the tower so that the tower resistance is low. Thus, a lower pressure and lower quantity of steam is necessary.

In the contact tower required for the Kubierscky's bromine distillation method, 27 kg steam at 3 kg/cm$^2$ is required to prepare 1 kg of bromine. However, in accordance with this invention only 1.44 kg steam at 2 kg/cm$^2$ is required. Referring to the FIGURE, one embodiment of the system of the invention is illustrated. In one embodiment of this invention, a reaction-distillation tower is provided having a diameter of 300 mm and a height of 6500 mm which is packed with Raschig rings having an outer diameter of 1 inch and a height of 1 inch, made of silico-boric acid glass. The length of the bromine portion, in which the reaction occurs is 2000 mm (length of packed layer is 1,700 mm) and the length of the distillation portion is 3000 mm (length of packed layer is 2,550 mm). A middle portion contains a bromine outlet between the reaction portion and the distillation portion. It is possible to treat 900–2,000 l/hr. of an aqueous solution containing 0.1–10%, preferably 2–10% of bromide, using this tower, to provide a recovery rate of greater than 97%. Since the recovery rate by the conventional Kubierscky's tower is only 90–95%, the recovery rate of the invention is remarkably high. The structure of the tower of the invention is quite simple and the operation is easy and quantity of loss of bromine is quite small. Moreover, the simplicity of the contact tower also facilitates repair, if such becomes necessary. When the process of this invention is used for processing aqueous solutions containing hydrobromic acid, this process will impart further advantages as compared with conventional processes. In the conventional Kubierscky's tower, the counter-current contact occurs in a flow, whereby the chlorine concentration around the top of the tower is low, and the hydrobromic acid in the solution is discharged together with steam in unreacted form. The reaction of the bromide with chlorine is exothermic however, when the solution contains hydrobromic acid so that the rate of consumption of chlorine is decreased. For example, when the reaction temperature is increased to about 90° C, the chlorine concentration of the exhaust gas is high and the recovery rate of $Br_2$ is decreased, even though no discharge of bromine in the waste solution from the bottom of the tower is observed. This shows that the process of this invention having the reaction temperature of lower than 80° C, will impart a greater effect than the use of high reaction temperatures, especially in the treatment of solutions containing hydrobromic acid as shown in Example 2 below.

Having generally described the invention, a more complete understanding can be obtained by reference to certain specific examples, which are included for purposes of illustration only and are not intended to be limiting unless otherwise specified.

EXAMPLE 1

The reaction-distillation tower(A) had a diameter of 300 mm and a height of 6500 mm, which is packed with Raschig rings having an outer diameter of 1 inch and a height of 1 inch which were made of silico-boric acid glass, and which had a 2,000 mm chlorinating reaction section and a 3,000 mm distillation section, which were separated by the bromine outlet section (4). An aqueous solution (1) containing 103.8 g/$l$ bromine and having a specific gravity of 1.07 (at 20° C) was fed at a rate of 1,200 $l$/hr. and chlorine gas (2) was fed at a rate of 61 kg/hr. from the top of the reaction-distillation tower. Steam (3) was fed from the bottom of the reaction-distillation tower. The maximum temperature of the reaction part was 49° C and the temperature at the outlet of bromine was 81° C. The temperature of solution (5) discharged from the bottom was 100°–101° C and total bromine content of the solution was 0.03 wt.%. The bromine distilled from the outlet was cooled in a heat-exchanger (B) and washed in the washing tower (C) with an aqueous solution (1) containing bromide at a rate of 60 $l$/hr., and the bromine (8) was recovered at a rate of 122 kg/hr. (recovery rate of 99.6%). The washed solution (7) was recycled to the top of reaction tower and the air was discharged through the valve (6).

EXAMPLE 2

In the system of Example 1, an aqueous solution containing 47.6 g/$l$ of HBr and 60.5 g/$l$ of NaBr was fed at a rate of 1,400 $l$/hr. and chlorine gas was fed at a rate of 70 kg/hr. from the top of the reaction-distillation tower. The temperature of the aqueous solution and chlorine was 18° C and the temperature in the reaction part of the tower reached to 51° C. The recovery rate of bromine was 99.5%. On the other hand, when the outlet of bromine was formed on the top of the tower and chlorine was charged from the bottom of the tower as in Kubierscky's method, the recovery rate of bromine was 91.2%.

Having now fully described the invention, it will be apparent to one of ordinary skill in the art that many changes and modifications can be made thereto without departing from the spirit or scope of the invention as set forth herein.

What is claimed as new and intended to be covered by letters patent is:

1. A continuous process for the preparation of bromine which comprises:
   1. cocurrently introducing an aqueous solution of a bromide or hydrobromic acid and chlorine gas into a contact tower; said contact tower being separated into an upper packed reaction section connected to a middle section having a bromine outlet port which in turn is connected to a lower packed distillation section; said cocurrent introduction being along the axis of said reaction section; wherein the aqueous solution of a bromide or hydrobromic acid is heated to less than 80° C in said reaction section while forming bromine in said aqueous solution; and wherein at least a part of said bromine is removed from the bromine outlet port; and
   2. introducing steam into the lower part of said distillation section, thereby countercurrently contacting the aqueous solution descending from step (1) with said steam to heat said aqueous solution in said distillation section to a temperature greater than 90° C, thereby distilling the remaining bromine from the bromine outlet port.

2. The continuous process for preparing bromine according to claim 1, wherein Raschig rings are packed in said reaction section and said distillation section but no Raschig rings are packed in said section containing a bromine outlet port.

* * * * *